US012810745B2

(12) United States Patent
Choi et al.

(10) Patent No.: US 12,810,745 B2
(45) Date of Patent: Nov. 24, 2026

(54) IOT-BASED APPROACH METHOD FOR LEARNING GEOMETRIC SHAPES IN EARLY CHILDHOOD AND DEVICE THEREOF

(71) Applicants: Industry Academia Cooperation Foundation Of Sejong University, Seoul (KR); Research & Business Foundation SUNGKYUNKWAN UNIVERSITY, Gyeonggi-do (KR)

(72) Inventors: Soo-Mi Choi, Seoul (KR); Abolghasem Sadeghi-Niaraki, Seoul (KR); Safari Bazargani Jalal, Seoul (KR); Fatema Rahimi, Seoul (KR); Tamer Is Abuhmed, Gyeonggi-do (KR)

(73) Assignees: Industry Academia Cooperation Foundation Of Sejong University, Seoul (KR); Research & Business Foundation SUNGKYUNKWAN UNIVERSITY, Gyeonggi-do (KR)

( * ) Notice: Subject to any disclaimer, the term of this patent is extended or adjusted under 35 U.S.C. 154(b) by 187 days.

(21) Appl. No.: 18/821,509

(22) Filed: Aug. 30, 2024

(65) Prior Publication Data

US 2025/0166525 A1 May 22, 2025

(30) Foreign Application Priority Data

Nov. 21, 2023 (KR) ........................ 10-2023-0162687

(51) Int. Cl.
*G09B 19/00* (2006.01)
*G09B 5/02* (2006.01)
*G16Y 20/10* (2020.01)

(52) U.S. Cl.
CPC ............... *G09B 19/00* (2013.01); *G09B 5/02* (2013.01); *G16Y 20/10* (2020.01)

(58) Field of Classification Search
None
See application file for complete search history.

(56) References Cited

U.S. PATENT DOCUMENTS

| | | | | |
|---|---|---|---|---|
| 10,847,046 | B2 * | 11/2020 | Bellamy | G09B 5/02 |
| 2005/0233288 | A1 * | 10/2005 | McGrath | G09B 7/00 434/118 |
| 2013/0224697 | A1 * | 8/2013 | McCallum | G09B 23/02 434/188 |
| 2019/0027054 | A1 * | 1/2019 | Olsen | G09B 7/00 |

FOREIGN PATENT DOCUMENTS

| | | | | |
|---|---|---|---|---|
| KR | 20140007545 A | * | 1/2014 | G06Q 50/2053 |
| KR | 10-2046224 | | 11/2019 | |
| KR | 20210042234 A | * | 4/2021 | G06Q 10/063 |

OTHER PUBLICATIONS

CheriEbooks—Kids Learning, Learn Shapes Montessori 3 Step Lesson | Shapes Preschooler, Kids—Ellipse, Oval, Quatrefoil, Mar. 23, 2019, https://www.youtube.com/watch?v=RazY3KorFwQ (Year: 2019).*

* cited by examiner

*Primary Examiner* — Steve Rowland
*Assistant Examiner* — Ishayu Singh
(74) *Attorney, Agent, or Firm* — Christensen O'Connor Johnson Kindness PLLC

(57) ABSTRACT

An IoT-based approach method for learning geometric shapes pre-school and a device thereof are disclosed. The method for learning geometric shapes may comprise providing a learning video for geometric shapes for a learner; and monitoring learning processes and learning outcomes of the learner for the geometric shapes.

3 Claims, 9 Drawing Sheets

(a) (b)

(a) (b)

(a)

(b)

FIG. 9
Awful
Not Very Good
Good
Really Good
Brilliant

IOT-BASED APPROACH METHOD FOR LEARNING GEOMETRIC SHAPES IN EARLY CHILDHOOD AND DEVICE THEREOF

This application claims the priority benefit of Korean Patent Application No. 10-2023-0162687, filed on Nov. 21, 2023, in the Korean Intellectual Property Office, the disclosure of which is incorporated herein by reference.

BACKGROUND

1. Field of the Invention

The following description relates to a technology for providing learning geometric shapes for children.

2. Description of Related Art

The Internet of Things (IoT), as an emerging technology, has become an indispensable part of everyday life. IoT consists of billions of physical devices, so-called "things", that are connected to the internet technology and collect and share data globally. With rapid development of other technologies such as cloud computing and big data, the role of IoT will increase.

Such IoT is employed in a wide range of domains, and the education sector is seen as holding especially promising prospects for implementing IoT applications. The involvement of IoT in education influences different parties namely learners, instructors, and entrepreneurs. A variety of tasks, learner-oriented or instructor-oriented, will be modified by IoT, those promoting diversity in children's learning processes being one example.

A considerable amount of research has been performed on benefiting from IoT in educational applications. As an example, Korean Registered Patent No. 10-2046224 (registration date: Nov. 12, 2019) discloses a technology that provides online news and video learning materials appropriate for learners' level to the learners through IoT-based technology.

SUMMARY

An IoT-based approach method for teaching basic geometric shapes to children aged 5 and 6 may be provided.

An IoT physical node can act as vertices of geometric shapes and provide a learning solution using educational videos comprising three sections—identification, recognition, and recollection—.

A method for learning geometric shapes of a computer device including at least one processor comprises providing a learning video for geometric shapes for a learner by the at least one processor; and monitoring learning processes and learning outcomes of the learner for the geometric shapes by the at least one processor.

According to one aspect, the providing may provide a video consisting of an identification stage video, a recognition stage video, and a recollection stage video for the geometric shapes.

According to another aspect, the providing may provide a video using audio and visual features, signaling, and guiding questions as a video for learning the geometric shapes.

According to another aspect, the monitoring may comprise performing a simultaneous test for evaluating level of understanding for the geometric shapes while a program using the learning video is in progress.

According to another aspect, the monitoring may comprise performing a simultaneous test for evaluating level of understanding for the geometric shapes while the recognition stage video is provided.

According to another aspect, the monitoring may further comprise performing a pre-test for evaluating current knowledge for the geometric shapes prior to starting the program using the learning video, or a post-test for evaluating learning processes and leaning outcomes after the program using the learning video is completed.

According to another aspect, the method may conduct activity for creating the geometric shapes by using an IoT (Internet of Things) sensor device while the program using the learning video is in progress.

According to another aspect, the method for learning geometric shapes may further comprise predicting created shapes by location of the IoT sensor device based on coordinates of the IoT sensor device located by the learner by the at least one processor.

According to another aspect, the predicting may comprise calculating local coordinates of each IoT sensor device by using distance between a reference IoT sensor device and another IoT sensor device; and deducing geometric shapes with local coordinates of each IoT sensor device as vertices.

A computer program stored in a computer readable medium for executing the method for learning geometric shapes in the computer device is provided.

A computer device, comprising at least one processor implemented to execute instructions readable in the computer device, wherein the at least one processor provides a learning video for geometric shapes for a learner, and monitors learning processes and learning outcomes of the learner for the geometric shapes, is provided.

According to embodiments of the present disclosure, a beneficial learning solution in terms of both learning outcomes and learning processes through an IoT physical node acting as vertices of geometric shapes, and educational videos comprising three sections (identification, recognition, and recollection).

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Hereinafter, embodiments of the present disclosure are described with reference to the accompanying drawings.

Embodiments of the present disclosure relate to a technology for providing learning geometric shapes for children.

The embodiments disclosed in this specification is the integration of educational videos and IoT nodes for teaching geometric shapes to children aged 5 and 6, and at this time, the IoT nodes, capable of range detection, may be designed so that the participants can use them as vertices in order to make geometric shapes. Specifically, the embodiments provide a learning solution including hardware design and educational videos, and may use a pre-test, a simultaneous test, and a post-test to monitor learning processes and outcomes. The learning processes to be monitored mean changes in children's interest in geometry, and the learning outcomes mean educational achievements based on the children's performance.

A device for learning geometric shapes according to the embodiments of the present disclosure may be implemented by at least one computer device, and a method for learning geometric shapes according to the embodiments of the present disclosure may be performed by at least one computer device included in the device for learning geometric shapes. At this time, the computer device may have a computer grogram installed and executed according to one embodiment of the present disclosure, and the computer device may perform the method for learning geometric shapes according to the embodiments of the present disclosure under the control of the executed computer program. The above described computer program may be combined with the computer device and stored on a computer-readable recording medium to execute the method for learning geometric shapes on the computer.

Figure 1:
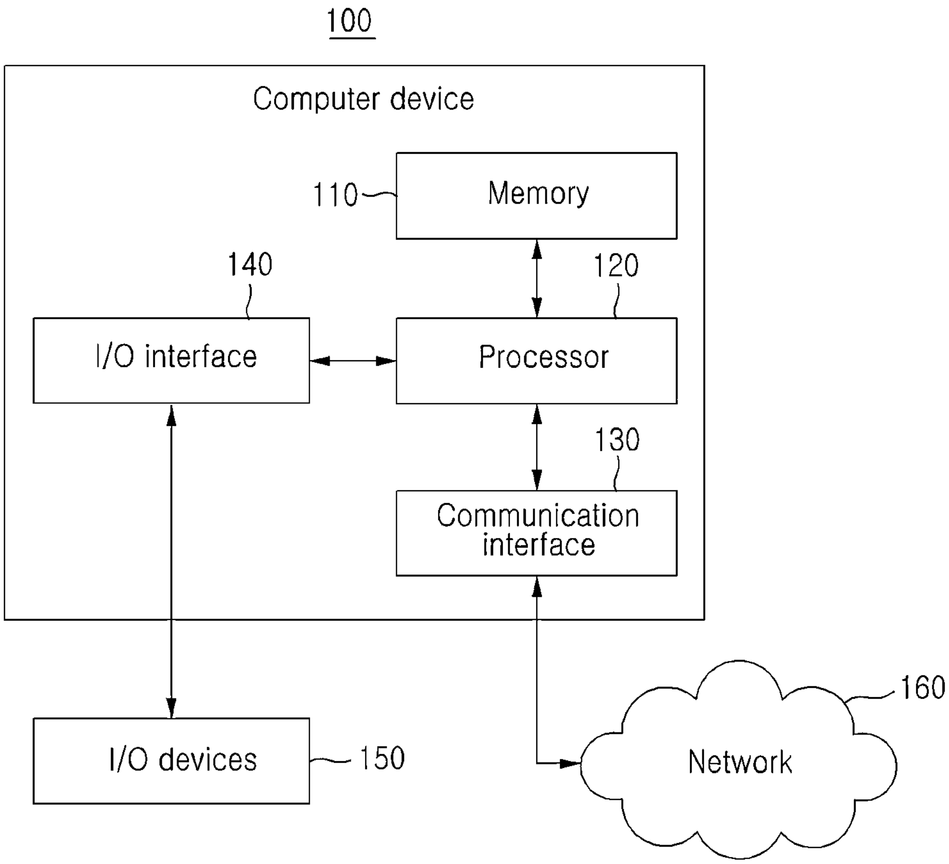
FIG. 1 is a block diagram for describing an example of internal configuration of a computer device according to one embodiment of the present disclosure.

FIG. 1 is a block diagram illustrating a computer device according to one embodiment of the present disclosure. For example, the device for learning geometric shapes according to the embodiments of the present disclosure may be implemented by a computer device 100 shown in FIG. 1.

As shown in FIG. 1, the computer device 100 may include a memory 110, a processor 120, a communication interface 130, and an input/output (I/O) interface 140 as components for executing the method for learning geometric shapes according to the embodiments of the present disclosure.

The memory 110 is a computer-readable recording medium, and may include a permanent mass storage devices, such as a random access memory (RAM), a read only memory (ROM) and a disk drive. Here, the permanent mass storage device, such as a ROM and a disk drive, may be included in the computer device 100 as a permanent storage device separated from the memory 110. Furthermore, an operating system and at least one program code may be stored in the memory 110. Such software components may be loaded from a computer-readable recording medium separated from the memory 110 to the memory 110. Such a separate computer-readable recording medium may include computer-readable recording media, such as a floppy drive, a disk, a tape, a DVD/CD-ROM drive, a memory card, and the like. In another embodiment, software components may be loaded onto the memory 110 through the communication interface 130, not a computer-readable recording medium. For example, the software components may be loaded onto the memory 110 of the computer device 100 based on a computer program installed by files received through a network 160.

The processor 120 may be configured to process instructions of a computer program by performing basic arithmetic, logic and I/O operations. The instructions may be provided to the processor 120 by the memory 110 or the communication interface 130. For example, the processor 120 may be configured to execute instructions received according to program code stored in a recording device, such as the memory 110.

The communication interface 130 may provide a function for enabling the computer device 100 to communicate with other devices through the network 160. For example, a request, an instruction, data or a file generated by the processor 120 of the computer device 100 according to program code stored in a recording device such as the memory 110 may be transmitted to other devices through the network 160 according to control of the communication interface 130. Inversely, a signal, an instruction, data or a file from another device may be received to the computer device 100 through the communication interface 130 of the computer device 100 passing through the network 160. A signal, an instruction or data and the like received through the communication interface 130 may be transmitted to the processor 120 or the memory 110, and a file may be stored in a storage medium (above described permanent storage device) which may be further included in the computer device 100.

A communication method is not limited, and may include short-distance wired/wireless communication between devices in addition to communication methods using communication networks (e.g., a mobile communication network, wired Internet, wireless Internet, a broadcasting network, and the like) which may be included in the network 160. For example, the network 160 may include one or more any networks of a personal area network (PAN), a local area network (LAN), a campus area network (CAN), a metropolitan area network (MAN), a wide area network (WAN), a broadband network (BBN), and the Internet. Furthermore, the network 160 may include any one or more of network topologies, including a bus network, a star network, a ring network, a mesh network, a star-bus network, and a tree or hierarchical network, but is not limited thereto.

The I/O interface 140 may be means for interface with an input/output (I/O) device 150. For example, the input device may include a device such as a microphone, a keyboard or a mouse and the like, and the output device may include a device such as a display or a speaker. For another example, the I/O interface 140 may be means for interface with a device in which functions for input and output have been integrated into one, such as a touch screen. The I/O devices 150, together with the computer device 100, may be configured as a single device.

Furthermore, in other embodiments, the computer device 100 may include components less or more than the components of FIG. 1. However, it is not necessary to clearly illustrate most of conventional components. For example, the computer device 100 may be implemented to include at least some of the I/O device 150 above described or may further include other components such as a transceiver, a camera, various sensors, a database, etc.

Hereinafter, specific embodiments of the IoT-based approach technology for learning geometric shapes for preschool will be described.

IoT devices are becoming ubiquitous and are having an impact on how young children play, learn, and grow all across the world. Some researches highlighted that when IoT is brought into children's learning environment, children conceptualize higher mental functions, such as continuous and ongoing problem-solving dispositions, language acquisition, and social learning.

There are several fields using IoT for children. Some technical fields explored the involvement of IoT-based 3D books in the learning environment of children acquiring a foreign language. Also, an IoT-based learning aid which noticeably improved children's knowledge of air pollution is being developed. In addition to studies targeting learning outcomes directly, some focus on the underlying framework or infrastructure. For example, there is an online monitoring system for children benefiting from 5G and IoT, and this relates to optimization including lowering of energy consumption.

Meanwhile, geometry is a well-known mathematical topic with numerous real-world applications, and it is primarily connected with visual and spatial qualities and is used in a wide array of fields such as art, architecture, and astronomy. It is important to learn geometry at an early age since that is when children start to develop geometric and spatial orientation perceptions. That is to say, education at this juncture plays an important role in children's learning experiences.

Another perspective that emphasizes the importance of learning geometry is the claim that geometric concepts underline all mathematical topics. Many elementary school children have a negative attitude toward geometry, and this is a result of the textbooks' restricted concept of geometry. The negative attitude will probably cause difficulties for teachers following traditional approaches in teaching children geometry.

Therefore, adding technology and some physical activity will make the learning of geometry interesting, and assist teachers in offering more interesting pedagogical strategies. Regarding the use of IoT for geometry education, the involvement of hand movement without physically interacting with devices might be confusing for children. On the other hand, physical manipulation might provide children with a better connection to technology, which in turn has a positive effect on psychological aspects. Apart from that, physical devices could be personalized in terms of appearance, making them more interesting from a child's viewpoint.

Figure 2:
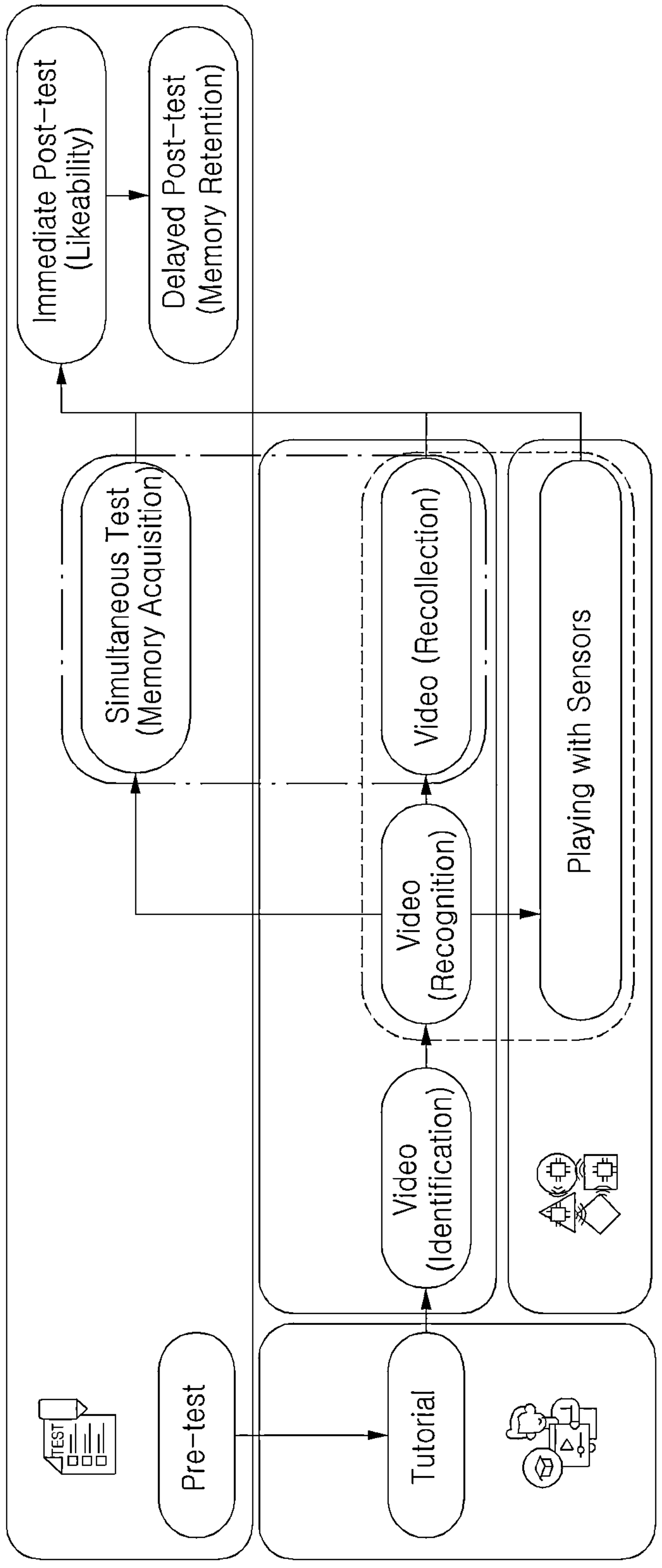
FIG. 2 illustrates overall framework for learning geometric shapes according to one embodiment of the present disclosure.

FIG. 2 illustrates overall framework for learning geometric shapes according to one embodiment of the present disclosure. FIG. 2 illustrates the process for monitoring learning process and learning outcomes through experiments using a pre-test, a simultaneous test, and a post-test.

The embodiment may provide a learning program for geometric shapes to participants using a video comprising three sections (identification, recognition, and recollection), and at this time, the shape created by the participants may be predicted by engaging in play activities using IoT-based sensor devices.

Figure 3:
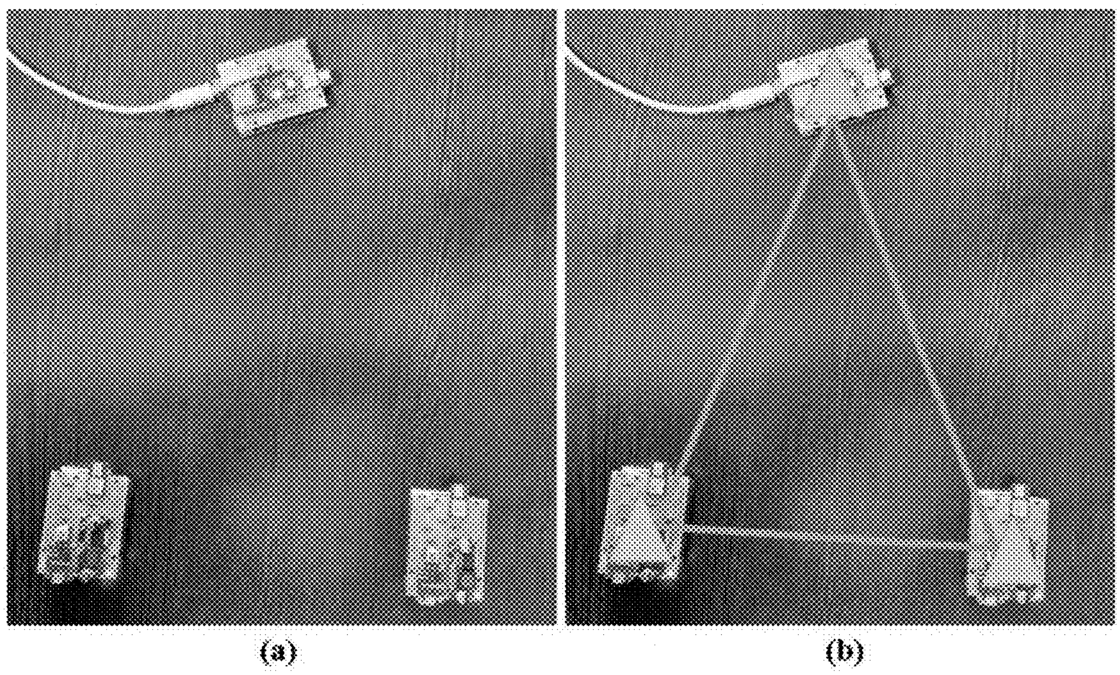
FIG. 3 illustrates an example of creating geometric shapes using an IoT physical node according to one embodiment of the present disclosure.

Referring to FIG. 2, the experiment of the embodiment begins with a pre-test which is given to the participants so that their current knowledge of geometric shapes can be assessed. Next, a tutorial is presented in order to make children familiar with how the system works. In the next step, the children are requested to watch the first section of educational videos which is the Identification section, and then, the Recognition section of the educational video is displayed. Children can play by creating various shapes using sensors while watching the Recognition section of the educational video (see FIG. 3). When the last section of the educational video which is the Recollection section starts, a teacher records the children's answers. Specifically, the children are asked to recollect the shapes and create them using different sensors, and these answers are used for assessing memory acquisition. Lastly, two types of post-tests are required. The first one, the immediate post-test, targets the similarity of the learning solution according to the present disclosure. Memory retention is evaluated from the second post-test, the delayed post-test, which is carried out one week after the experiment.

Figure 4:
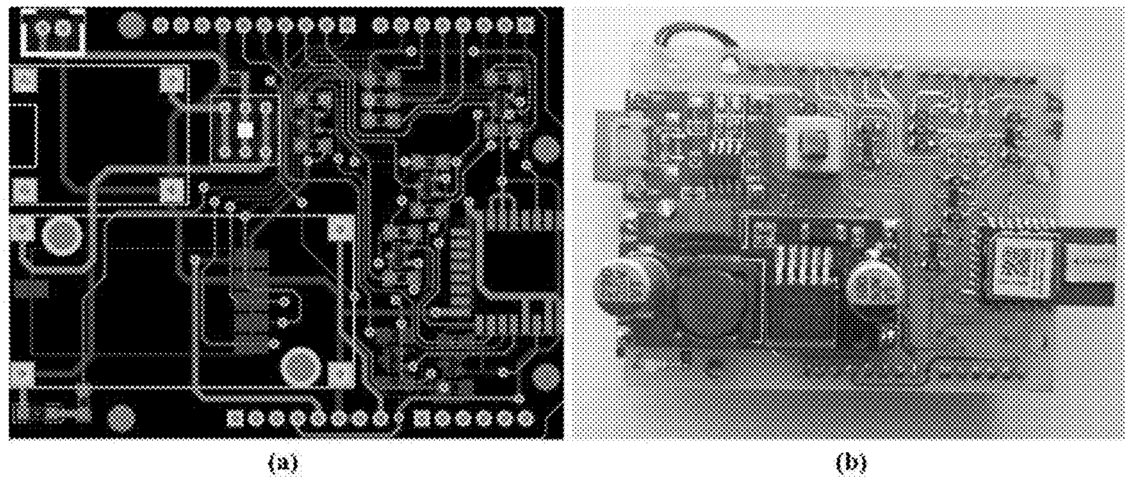
FIG. 4 illustrates an example of a sensor used for learning geometric shapes according to one embodiment of the present disclosure.

The participants for the learning may be children aged 5 and 6. The children aged 5 and 6 were chosen mainly as participants due to the fact that these years are seen as vital in terms of children's overall development. Additionally, early childhood has been identified as a suitable age for children to learn geometry and spatial reasoning. That is to say, although children can partially recognize different shapes, it is beneficial that they learn to think about shapes and space in their early years, before school. Regarding the required number of participants, the ideal sample size may be different depending on the aim of the research and the characteristics of the target population FIG. 4 illustrates an example of a sensor used for learning geometric shapes according to one embodiment of the present disclosure. FIG. 4 illustrates hardware design of a sensor.

The purpose of using sensors for learning geometric shapes is to enable the children to play with and move and place them at the vertices of the requested shape. Then, the local coordinates of each node are calculated using measured distances between sensors that the children placed, and through mathematical equations, the shapes created by the children may be predicted.

As a sensor used in learning geometric shapes, DWM1000 module used in this experiment is an IEEE802.15.4-2011 Ultra-Wideband (UWB) compliant wireless transceiver module based on Decawave's DMW1000 Integrated Circuit (IC). The precision of DWM1000 module is to be within 10 cm, offering 6.8 Mbps communication capability. The UWB signal offers a wide range of benefits, including causing no disturbance to other wireless technologies and superior multipath performance. However, the most important benefit for this research is high precision ranging capability. In other words, UWB technology generates short pulses integrated with time-of-flight measurements, providing precise locations with centimeter level accuracy.

The design of the Printed Circuit Board (PCB) is most important to ensure a board that is reliable and cost-effective. Several stages were considered in the design process, including concept definition, circuit schematic, component placement, refinement, routing, and testing. For example, there should be no metal, even batteries, near the antenna of the module for better performance.

The sensor used in learning geometric shapes in the present disclosure is composed of the UWB compliant wireless transceiver module, and it can send distances only.

The distance between two wireless devices may be calculated using two-way ranging and Time of Flight (ToF), by exchanging messages and monitoring the times of transmission and reception. Therefore, the local coordinates of each node are calculated using the measured distances. Finally, the local coordinates may be used to deduce the geometric shape constructed by the nodes as the vertices of the shape.

Figure 5:
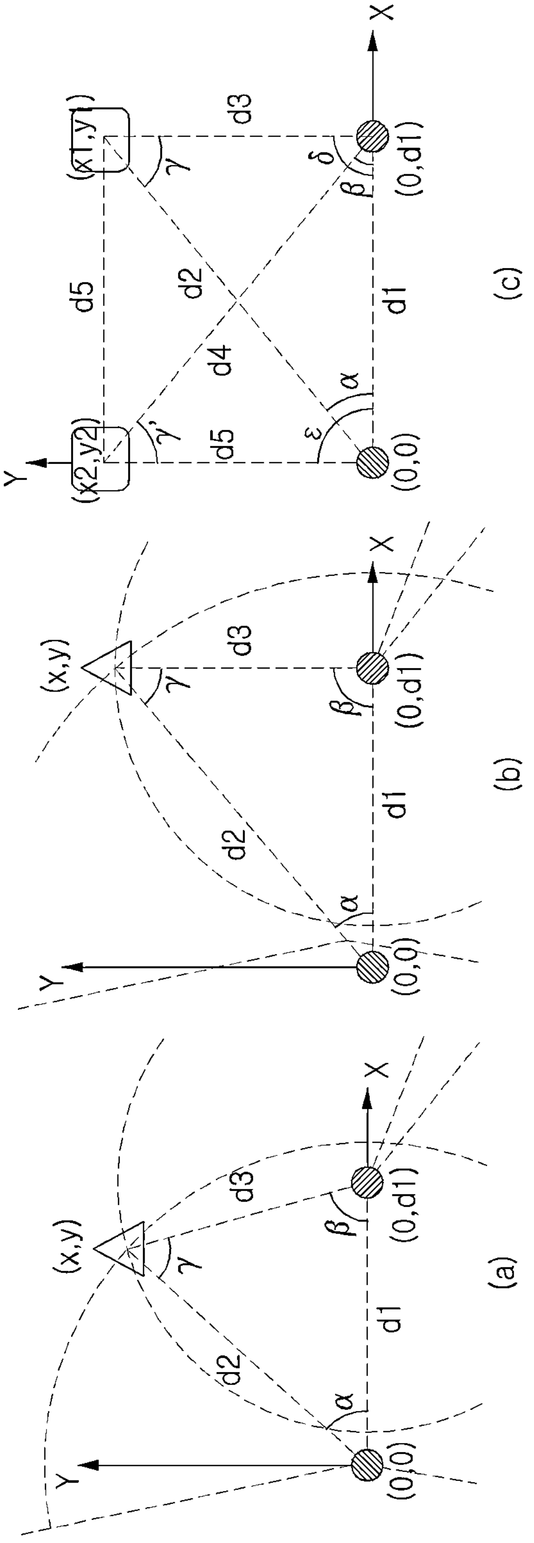
FIG. 5 is an example diagram for describing a local coordinate calculation process according to one embodiment of the present disclosure.

FIG. 5 is an example diagram for describing a local coordinate calculation process according to one embodiment of the present disclosure.

Referring to (a) of FIG. 5, in order to create a local coordinate system, (0,0) is assigned to the first node as its coordinate. Then, no matter where the second node is placed, that direction is considered the x-axis. Therefore, the coordinate of the second node will be (o,dl). Then, the y-axis will be perpendicular to this direction. Finally, if any additional node is used, its coordinate (x,y) will be calculated using the distances between the corresponding node and the main two nodes.

(a) of FIG. 5 illustrates initial steps and distances for calculating coordinates, and it may be also used for detecting simple triangles.

Equations 1 and 2 for calculating the coordinate are as follows.

$$x^2 + y^2 = d_3^2 \quad \text{[Equation 1]}$$

$$x^2 + (y - d_1)^2 = d_3^2 \quad \text{[Equation 2]}$$

where d means the distance between nodes. Using Equations 1 and 2, the final x and y are obtained.

$$y = 1/(2d_1)\left(d_2^2 + d_1^2 - d_3^2\right) \quad \text{[Equation 3]}$$

$$x = \sqrt{\left(d_2^2 - y^2\right)} \quad \text{[Equation 4]}$$

The angles can be also calculated, using Equations 5 and 6, in order to evaluate the accuracy of the measurements as well as other types of calculations for other shapes.

$$\cos^{-1}\left(\frac{d_3^2 - \left(d_1^2 + d_2^2\right)}{2d_1d_2}\right) = \alpha \quad \text{[Equation 5]}$$

$$\frac{\sin\alpha}{d_3} = \frac{\sin\beta}{d_2} = \frac{\sin\gamma}{d_1} \quad \text{[Equation 6]}$$

The (b) of FIG. 5 illustrates the initial steps and distances for calculating the coordinates of a right triangle as information for geometric shape of right triangle. The (c) of FIG. 5 illustrates the initial steps and distances for calculating the coordinates of a rectangle as information for geometric shape of rectangle.

Materials provided for learning geometric shapes are as follows.

For the learning materials, different videos for different geometric shapes may be provided. Videos can be significantly educational. If used properly, they can noticeably improve learners' knowledge acquisition, and make the learning process enjoyable. Different elements need to be taken into account in producing educational videos.

The considerations for creating educational videos in this embodiment are as follows: 1) videos are brief so that the viewer stays focused on learning objectives, 2) audio and visual features are employed to communicate important portions of a story, 3) signaling is used so as to draw attention to key concepts, and 4) guiding questions are used to make the learning context active.

The videos may be created to teach children geometric shapes such as triangle, square, rectangle, parallelogram, and right triangle. At this time, the video consists of three stages: identification, recognition, and recollection. The identification stage of video, the recognition stage of video, and the recollection stage of video may be provided sequentially.

Figure 6:
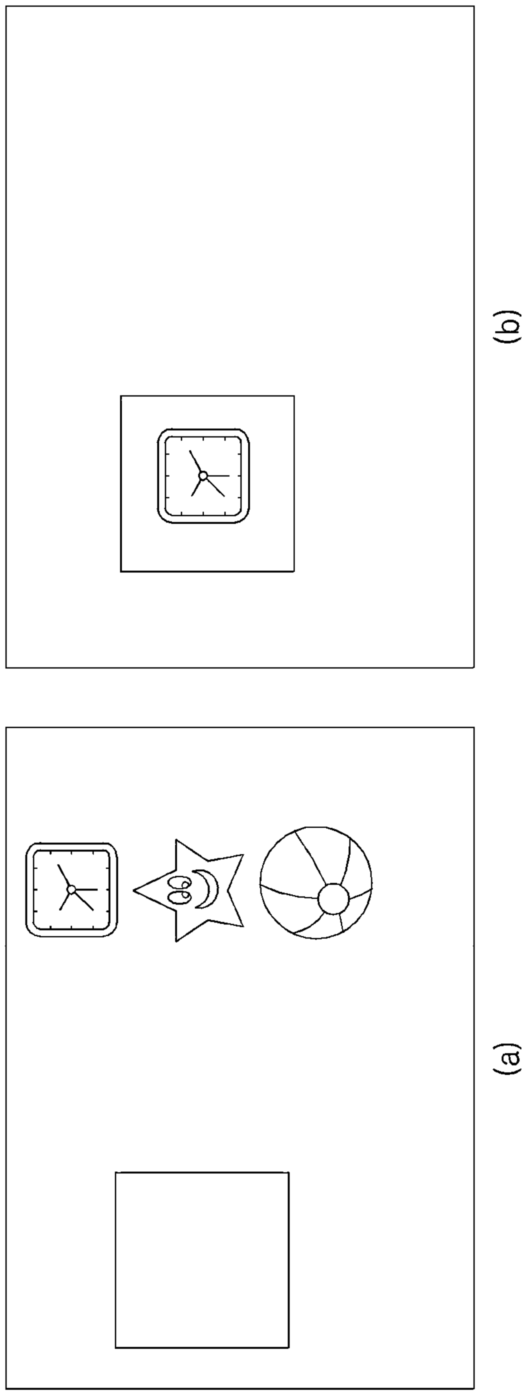
FIGS. 6 to 8 illustrate examples of videos consisting of identification, recognition, and recollection according to one embodiment of the present disclosure.

FIG. 6 is a video corresponding to identification stage according to one embodiment of the present disclosure, and (a) illustrates a video when a question is asked and (b) illustrates a video when the answer is revealed. In the identification stage, a user is supposed to identify the geometric shape according to the real objects shown. For example, as shown in FIG. 6, if the goal is to learn about the square, on the right side of the video, three objects are displayed and only one of them is a real-world example of a square. In this way, the learner is able not only to identify the shape but also to understand the name and shape of this geometric shape.

Figure 7:
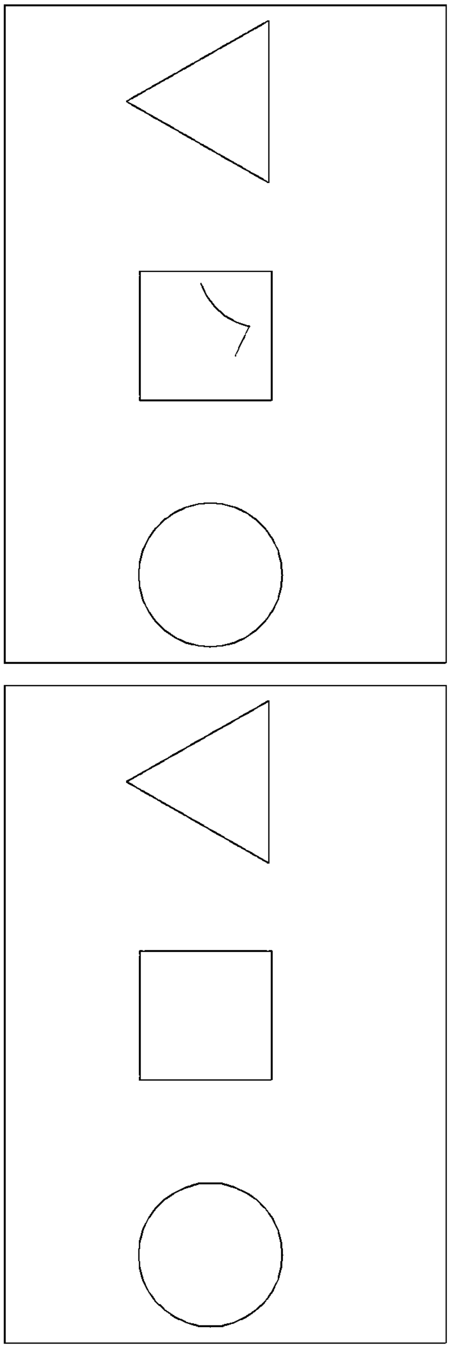

FIG. 7 is a video corresponding to recognition stage according to one embodiment of the present disclosure, and (a) illustrates a video when a question is asked and (b) illustrates a video when the answer is revealed. In the recognition stage following the identification stage, the user recognizes which shape is requested. For example, an auditory question asks the user to choose the square shape and the user is supposed to recognize and choose the shape presenting square, within a few seconds.

Figure 8:
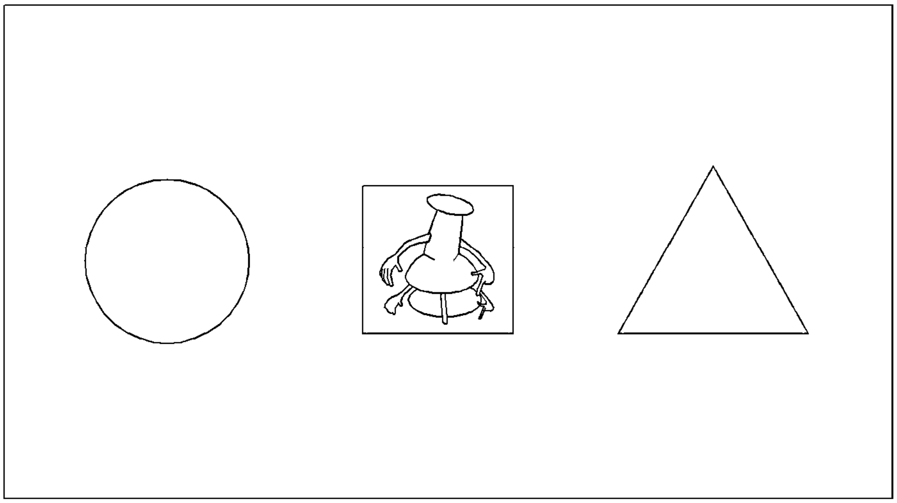

FIG. 8 illustrates a video corresponding to recollection stage according to one embodiment of the present disclosure. Finally, in the recollection stage which is the last stage, the user recollects the name of each shape. The recollection stage monitors children's performance in retrieving information about previous stages. For example, as shown in FIG. 8, the recollection stage in which the shape to be learned is highlighted and the user is asked to name the corresponding geometric shape may be provided.

To examine whether the learning program using the video comprising three stages of identification, recognition, and recollection for geometric shapes has an impact on children's learning skills, a pre-test, a simultaneous test, and a post-test are performed. The pre-test is performed at a tutorial stage, the simultaneous test is performed at recognition stage of the learning video, and the post-test is performed after the learning program using the video is completed.

The pre-test is designed to assess a child's skill level prior to applying the geometry IoT device and to evaluate the current knowledge of geometric shapes, and it is monitored by researchers.

The simultaneous test is designed to assess the level of the child's understanding of geometric shapes while using the IoT device. In other words, it is used to evaluate memory acquisition. In the simultaneous test phase, each child is observed by the researchers while using sensors and answering the questions. The responses assist in monitoring the learning outcome while using the system.

The post-test consists of two stages: immediate post-test and delayed post-test, and it is used to evaluate learning process and learning outcomes.

Figure 9:
FIG. 9 illustrates an example of a survey tool for a learning program according to one embodiment of the present disclosure.

In the immediate post-test stage of the post-test, the assessment is performed with Fun Toolkit v3, a survey tool developed to help researchers obtain technology (web or app) feedback from children. Fun Toolkit is extremely useful in gathering opinions from children with a noticeably adequate level of dependability. The Smileyometer and Again-Again Table from Fun Toolkit for children are utilized in this embodiment to assess the children's experiences. The Smileyometer has been widely used in analyses with children because it is simple to use and does not require any writing on the part of the children, and it is used to capture their reactions to both the activities and the IoT device. The Smiletometer as developed for children uses five smileys and is based on a 5-point Likert scale (see FIG. 9), with responses ranging from 1 (awful) to 5 (Brilliant). In terms of statistics, descriptive statistics, such as mean and standard deviation are used in this embodiment. The interpretation of mean score is based on Smileyometer of Table 1.

TABLE 1

| Mean Score | Interpretation |
|---|---|
| 1.00-2.00 | Awful |
| 2.01-3.00 | Not very good |
| 3.01-4.00 | Really good |
| 4.01-5.00 | Brilliant |

Another Fun Toolkit method is the Again-Again table. Table 2 shows how an Again-Again table is utilized to ask the children if they want to use the App to perform the activity again. This gives insight into the children's feeling of engagement. Three responses (Yes, Maybe, No) are available.

TABLE 2

| Would you like to play again? | | | | |
|---|---|---|---|---|
| User Name | User Age | Yes | Maybe | No |

The delay post-test step of the post-test is to evaluate the durability of children's retention of geometric shapes taught to the children after one week. Simply put, it targets the memory retention of children after using the learning program of the present disclosure.

Likewise, according to embodiments of the present disclosure, a beneficial learning solution in terms of both learning outcomes and learning process through an IoT physical node acting as vertices of geometric shapes and educational videos comprising three sections (identification, recognition, and recollection) may be provided. Providing more enjoyable learning process for children may improve user satisfaction and enjoyment, and this will have more educational effect when the children become students and attend geometry classes.

The device described herein may be implemented using hardware components, software components, and/or a combination thereof. For example, the device and components described in the embodiments may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions. The processing device may run an operating system (OS) and one or more software applications that run on the OS. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device in order to provide instructions or data to the processing device or be interpreted by the processing device. The software also may be distributed over network coupled computer systems so that the software is stored and executed in a distributed fashion. The software and data may be stored by one or more computer readable recording mediums.

The method according to the embodiments may be implemented in the form of a program instruction executable by various computer means and stored in a computer-readable storage medium. The medium may continue to store a program executable by a computer or may temporarily store the program for execution or download. Furthermore, the medium may be various recording means or storage means of a form in which one or a plurality of pieces of hardware has been combined, and the medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method for learning geometric shapes of a computer device including at least one processor, comprising:

providing a learning video for geometric shapes for a learner by the at least one processor;

monitoring learning processes and learning outcomes of the learner for the geometric shapes by the at least one processor; and predicting created shapes by location of an IoT (Internet of Things) sensor device based on coordinates of the IoT sensor device located by the learner by the at least one processor, wherein the providing comprises:

providing a video using audio and visual features, signaling, and guiding questions as a video for teaching the geometric shapes; and providing a video sequentially consisting of an identification stage video, a recognition stage video, and a recollection stage video for the geometric shapes, wherein the monitoring comprises:

performing a pre-test for evaluating current knowledge for the geometric shapes prior to starting a program using the learning video;

performing a simultaneous test for evaluating level of understanding for the geometric shapes while the recognition stage video is provided; and performing a post-test for evaluating learning processes and learning outcomes after the program using the learning video is completed, wherein an activity for creating the geometric shapes by using the IoT sensor device is conducted in parallel while the recognition stage video is provided, and wherein the predicting comprises:

calculating local coordinates of each IoT sensor device by using distance between a reference IoT sensor device and another IoT sensor device; and deducing geometric shapes with the local coordinates of each IoT sensor device as vertices.

2. A non-transitory computer-readable recording medium storing program instructions to execute the method for learning geometric shapes of claim 1 on the computer device.

3. A computer device, comprising at least one processor implemented to execute instructions readable in the computer device, wherein the at least one processor provides a learning video for geometric shapes for a learner, monitors learning processes and learning outcomes of the learner for the geometric shapes, and predicts created shapes by location of an IoT (Internet of Things) sensor device based on coordinates of the IoT sensor device located by the learner, wherein the at least one processor provides a video using audio and visual features, signaling, and guiding questions as a video for teaching the geometric shapes, and provides a video sequentially consisting of an identification stage video, a recognition stage video, and a recollection stage video for the geometric shapes, wherein the at least one processor performs a pre-test for evaluating current knowledge for the geometric shapes prior to starting a program using the learning video, performs a simultaneous test for evaluating level of understanding for the geometric shapes while the recognition stage video is provided, and performs a post-test for evaluating learning processes and learning outcomes after the program using the learning video is completed, wherein an activity for creating the geometric shapes by using the IoT sensor device is conducted in parallel while the recognition stage video is provided, and wherein the at least one processor calculates local coordinates of each IoT sensor device by using distance between a reference IoT sensor device and another IoT sensor device, and deduces geometric shapes with the local coordinates of each IoT sensor device as vertices.

* * * * *